(12) United States Patent
Hong et al.

(10) Patent No.: US 10,982,752 B2
(45) Date of Patent: Apr. 20, 2021

(54) VEHICLE AND METHOD FOR CONTROLLING THE SAME

(71) Applicants: HYUNDAI MOTOR COMPANY, Seoul (KR); KIA MOTORS CORPORATION, Seoul (KR)

(72) Inventors: Gi Beom Hong, Bucheon-si (KR); Seunghyun Woo, Seoul (KR); Daeyun An, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 396 days.

(21) Appl. No.: 15/806,284

(22) Filed: Nov. 7, 2017

(65) Prior Publication Data
US 2018/0363764 A1  Dec. 20, 2018

(30) Foreign Application Priority Data

Jun. 14, 2017 (KR) .......................... 10-2017-0074887

(51) Int. Cl.
| | | |
|---|---|---|
| *F16H 59/00* | (2006.01) | |
| *F16H 59/02* | (2006.01) | |
| *F16H 59/10* | (2006.01) | |
| *F16H 63/42* | (2006.01) | |

(52) U.S. Cl.
CPC ......... *F16H 59/0278* (2013.01); *F16H 59/10* (2013.01); *F16H 59/105* (2013.01); *F16H 63/42* (2013.01); *F16H 2063/423* (2013.01)

(58) Field of Classification Search
CPC .... F16H 59/0278; F16H 59/105; F16H 63/42; F16H 59/10; F16H 2063/423; F16H 2063/426; G05G 1/06
See application file for complete search history.

(56) References Cited

U.S. PATENT DOCUMENTS

| | | | |
|---|---|---|---|
| 8,881,347 B2 * | 11/2014 | Feinstein ................. | B25G 1/01 16/430 |
| 10,459,475 B2 * | 10/2019 | Gandhi ............... | F16H 59/0278 |
| 2018/0321703 A1 * | 11/2018 | Gandhi .................... | G05G 1/06 |
| 2019/0113130 A1 * | 4/2019 | An ....................... | F16H 59/0278 |
| 2019/0113132 A1 * | 4/2019 | Woo ........................ | F16H 59/08 |
| 2019/0299909 A1 * | 10/2019 | Alexander ........ | B60R 21/01566 |

FOREIGN PATENT DOCUMENTS

| | | |
|---|---|---|
| JP | 2003005851 | 1/2003 |
| KR | 100144526 | 8/1998 |
| KR | 1019980057331 | 9/1998 |
| KR | 1020020097312 | 12/2002 |
| KR | 1020030016840 | 3/2003 |

* cited by examiner

*Primary Examiner* — Victor L MacArthur
(74) *Attorney, Agent, or Firm* — Lempia Summerfield Katz LLC

(57) ABSTRACT

A vehicle includes a gearshift command input portion expandable to have a volume corresponding to a gearshift range changed by a gearshift command. The vehicle includes a gearshift command input portion, a volume of which is controlled by a control signal, is configured to receive a gearshift command for changing a gearshift range. The vehicle includes a controller configured to transmit a control signal to the gearshift command input portion in a manner that the gearshift command input portion is expanded to have a volume corresponding to the changed gearshift range. A method of controlling the vehicle includes the gearshift command input portion.

19 Claims, 18 Drawing Sheets

VEHICLE AND METHOD FOR CONTROLLING THE SAME

CROSS-REFERENCE TO RELATED APPLICATION

This application claims the priority benefit of Korean Patent Application No. 10-2017-0074887, filed on Jun. 14, 2017 in the Korean Intellectual Property Office, the disclosure of which is incorporated herein by reference.

BACKGROUND

1. Field

Embodiments of the present disclosure relate to a vehicle including a gearshift command input portion configured to receive a gearshift command, and relate to a method for controlling the same.

2. Description of the Related Art

In general, a vehicle is a transportation device, which travels on roads or tracks using fossil fuels, electricity, and the like as a power source.

Gear-shifting of the vehicle may be achieved by manipulation of a gearshift device (also called a transmission) and a gearshift command input portion. Here, the transmission may receive drive power from an engine and transmit the drive power to wheels, and the gearshift command input portion may change a gearshift range of the transmission. The gearshift range may form a unique gearshift route, and a driver of the vehicle may manipulate the gearshift command input portion along the formed gearshift route, resulting in vehicle gear-shifting.

A Shift-by-Wire (SBW) gearshift command input portion has been actively researched by many developers and companies. Such a SBW gearshift command input portion may receive a gearshift command along various gearshift routes in a different way from a conventional mechanical gearshift command input portion.

SUMMARY

Therefore, it is an aspect of the present disclosure to provide a vehicle for expanding a gearshift command input portion to have a volume corresponding to a gearshift range changed by a gearshift command. It is another aspect of the present disclosure to provide a method for controlling the same.

Additional aspects of the disclosure are set forth in part in the description which follows and, in part, will become evident from the description, or may be learned by practice of the disclosure.

In accordance with an aspect of the present disclosure, a vehicle includes a gearshift command input portion, a volume of which is controlled by a control signal. The gearshift command input portion is configured to receive a gearshift command for changing a gearshift range. The vehicle includes a controller configured to transmit a control signal to the gearshift command input portion in a manner that the gearshift command input portion is expanded to have a volume corresponding to the changed gearshift range.

The gearshift command input portion may include a shift lever including at least one opening, the shift lever configured to receive the gearshift command in response to the changed gearshift position. The gearshift command input portion may include an elastic cover provided in the at least one opening.

The gearshift command input portion may further include a fluid supply portion configured to provide fluid to an inner space of the shift lever so as to expand the elastic cover.

The fluid supply portion may provide a predetermined amount of fluid corresponding to the changed gearshift range to the inner space of the shift lever.

The shift lever may include an inner partition for dividing the inner space into a plurality of inner sub-spaces.

The fluid supply portion may provide the fluid to at least one inner sub-space corresponding to the changed gearshift range from among the plurality of inner sub-spaces.

The vehicle may further include a pressure sensing portion configured to detect pressure of the inner space of the shift lever.

The controller may control the amount of supplied fluid based on the detected pressure of the inner space of the shift lever.

The gearshift command input portion may include an actuator configured to pressurize the elastic cover within the inner space of the shift lever in a manner that the elastic cover is expanded.

The elastic cover may include a plurality of protrusions formed at an outer surface thereof.

In accordance with another aspect of the present disclosure, a method is for controlling a vehicle having a gearshift command input portion that has a volume capable of being expanded and that receives a gearshift command for changing a gearshift range. The method includes receiving the gearshift command, changing the gearshift range according to the received gearshift command, and expanding the gearshift command input portion to have a volume corresponding to the changed gearshift range.

The gearshift command input portion may include a shift lever including at least one opening, the shift lever configured to receive the gearshift command in response to the changed gearshift position. The gearshift command input portion may include an elastic cover provided in the at least one opening.

The step of expanding the gearshift command input portion may further include providing fluid to an inner space of the shift lever so as to expand the elastic cover.

The step of providing the fluid to the inner space of the shift lever may include providing a predetermined amount of fluid corresponding to the changed gearshift range to the inner space of the shift lever.

The shift lever may include an inner partition for dividing the inner space into a plurality of inner sub-spaces.

The step of providing the fluid to the inner space of the shift lever may include providing the fluid to at least one inner sub-space corresponding to the changed gearshift range from among the plurality of inner sub-spaces.

The step of providing the fluid to the inner space of the shift lever may include detecting pressure of the inner space of the shift lever.

The step of providing the fluid to the inner space of the shift lever may include determining a cut-off time at which supply of the fluid is prevented based on the detected pressure of the inner space of the shift lever.

The step of expanding the gearshift command input portion to have volume corresponding to the changed gearshift range may pressurize the elastic cover using an actuator provided in the inner space of the shift lever in a manner that the elastic cover is expanded.

The elastic cover may include a plurality of protrusions formed at an outer surface thereof.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Figure 1:
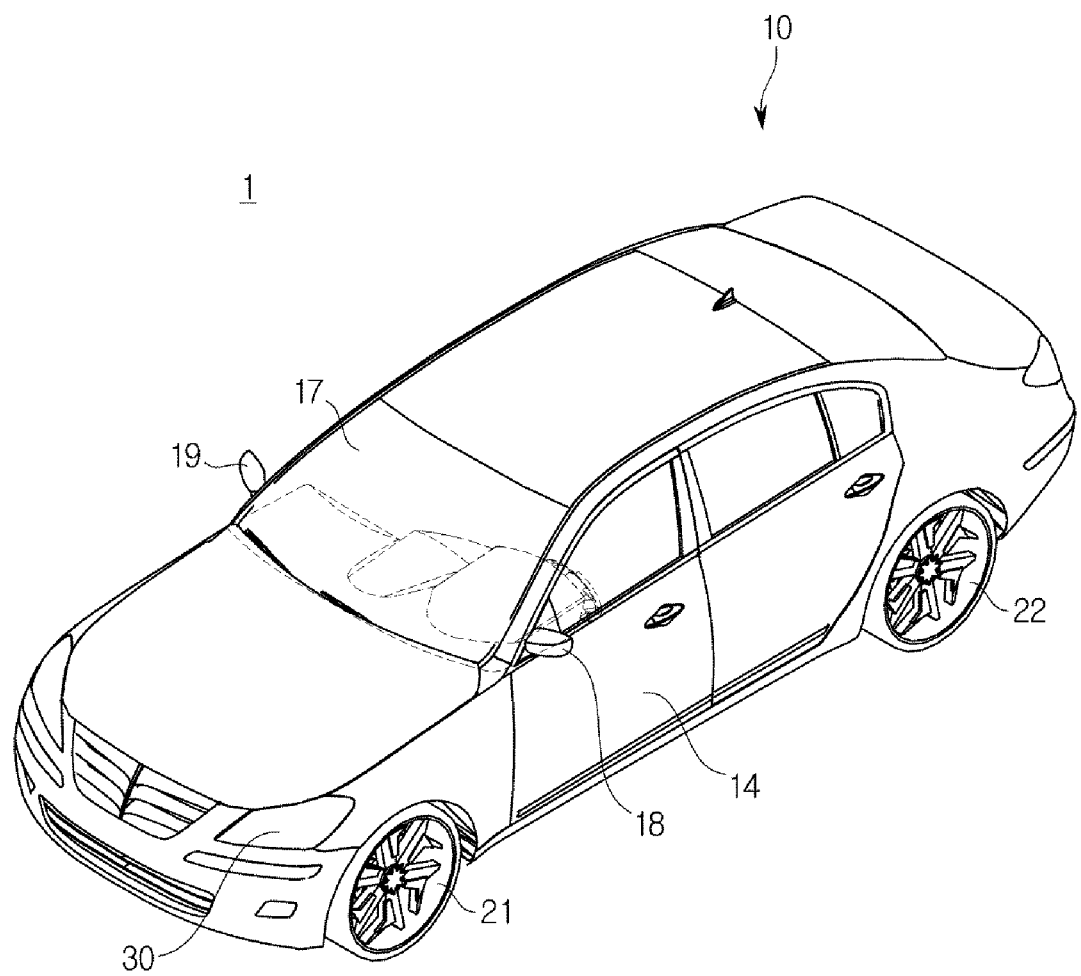
FIG. 1 is a view illustrating the appearance of a vehicle according to an embodiment of the present disclosure.

Reference is now made in detail to the embodiments of the present disclosure, examples of which are illustrated in the accompanying drawings, wherein like reference numerals refer to like elements throughout. A vehicle and a method for controlling the same according to embodiments of the present disclosure are hereinafter described with reference to the attached drawings.

FIG. 1 is a view illustrating the appearance of a vehicle according to an embodiment of the present disclosure.

Referring to FIG. 1, the vehicle 1 may include a main body 10 forming the appearance of the vehicle 1, vehicle wheels 21 and 22 to move the vehicle 1 from place to place, doors 14 to shield an interior space of the vehicle 1 from the outside, a vehicle windshield 17 to provide a forward view of the vehicle 1 to a vehicle driver who rides in the vehicle 1, and side-view mirrors 18 and 19 to provide a rear view of the vehicle 1 to the vehicle driver.

The wheels 21 and 22 may include front wheels 21 provided at the front of the vehicle and rear wheels 22 provided at the rear of the vehicle. The front wheels 21 or the rear wheels 22 may receive rotational force from a drive portion 700 in a manner that the main body 10 moves forward or backward.

The doors 14 are rotatably provided at the right and left sides of the main body 10 so that a vehicle driver or passenger can get into the vehicle 1 when any of the doors 14 is open. The interior space of the vehicle 1 can be shielded from the outside when the doors 14 are closed.

The windshield 17 is provided at a front upper portion of the main body 10 so that a vehicle driver who rides in the vehicle 1 can obtain visual information of a forward direction of the vehicle 1. The windshield 17 may also be referred to as a windshield glass.

The side-view mirrors 18 and 19 may include a left side-view mirror 18 provided at the left of the main body 10 and a right side-view mirror 19 provided at the right of the main body 10, so that the driver who rides in the vehicle 1 can obtain visual information of the lateral and rear directions of the vehicle 1.

In addition, lamps 30 are provided at the front and/or rear of the vehicle 1 such that the lamps 30 may provide the driver with a clear view and inform peripheral vehicles of a travel route of the vehicle 1.

Figure 2:
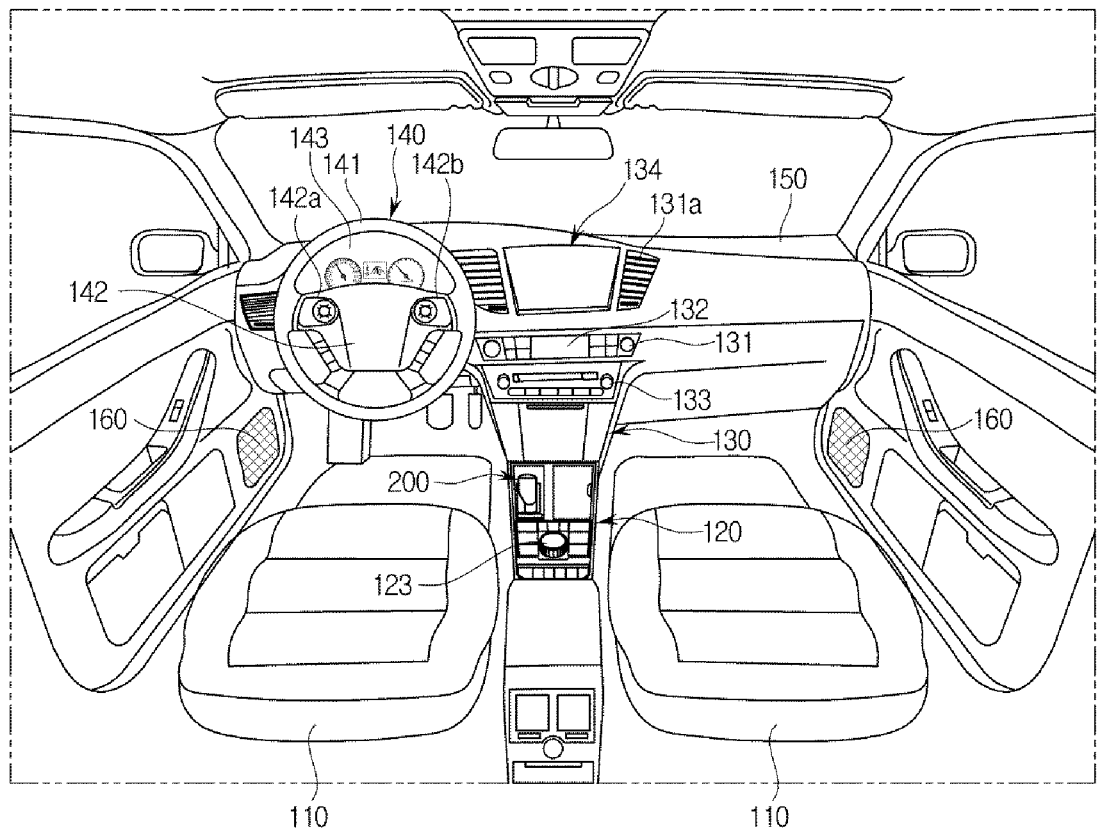
FIG. 2 is a view illustrating the interior space of the vehicle according to an embodiment of the present disclosure.

FIG. 2 is a view illustrating the interior space of the vehicle according to an embodiment of the present disclosure.

Referring to FIG. 2, the vehicle 1 may have seats 110 on which a driver or passenger is seated, a dashboard 150 including a gearbox 120, a center fascia 130, a steering wheel 140, and the like.

The steering wheel 140 of the dashboard 150 is a device that adjusts a traveling direction of the vehicle 1. The steering wheel 140 has a rim 141 grasped by a vehicle driver and is connected to a steering device of the vehicle 1. The steering wheel 140 may include a spoke 142 to connect the rim 141 to a hub of a rotation axis for steering. In accordance with one embodiment, the spoke 142 may include various devices embedded in the vehicle 1, for example, manipulation devices 142a and 142b for controlling the audio device and the like.

An instrument cluster 143 may include a speed gauge to display a traveling speed of the vehicle 1 and an RPM gauge to display revolutions per minute (RPM) of an engine of the vehicle 1, such that the driver may recognize vehicle information at a glance. In addition, the instrument cluster 143 may display information of the vehicle 1, especially, traveling information of the vehicle 1. For example, the instrument cluster 143 may display a mileage based on the remaining fuel quantity, navigation information, audio information, and the like.

The instrument cluster 143 may be located at a region facing the steering wheel 140 from among regions of the dashboard 150 such that the driver may easily view vehicle information at a glance during vehicle traveling.

Although not shown in the drawings, the dashboard 150 may include a Head Up Display (HUD) to display visual information for the driver on the windshield 17.

The center fascia 130 embedded in the dashboard 150 may include air-conditioner controls of an air-conditioner 131, a clock 132, an audio device 133, a display, and the like.

The air-conditioner controls 131 may operate the air-conditioner to maintain temperature, humidity, purity, and airflow of indoor air of the vehicle 1 in a comfortable or pleasant condition. The air-conditioner controls 131 may be installed at the center fascia 130 and may include at least one air outlet 131a through which air is discharged to the interior space. A button or dial of the air-conditioner controls 131 may be installed at the center fascia 130 for controlling the air-conditioner. A user such as a vehicle driver may control the air-conditioner of the vehicle using the button or dial or the air-conditioner controls mounted to the center fascia 130.

The clock 132 may be located in the vicinity of the button or dial for controlling the air-conditioner.

The audio device 133 may include a manipulation panel including a plurality of buttons needed to perform functions of the audio device 133. The audio device 133 may provide a radio mode for providing a radio function and a media mode for reproducing audio files stored in various storage media.

The audio device 133 may audibly output the audio files through a speaker 160. Although FIG. 2, by example, illustrates the speaker 160 installed at the inside of the doors for convenience of description, the installation position of the speaker 160 is not limited thereto.

The display 134 may display various kinds of information directly or indirectly associated with the vehicle. For example, the display 134 may display not only direct information such as navigation information and state information of the vehicle, but also indirect information such as multimedia information including pictures and moving images received from inside and outside of the vehicle.

The display 134 may be implemented by any one of a Liquid Crystal Display (LCD), a Light Emitting Diode (LED), a Plasma Display Panel (PDP), an Organic Light Emitting Diode (OLED), a Cathode Ray Tube (CRT), or the like, without being limited thereto.

A gearshift command input portion 200 for changing speed of the vehicle 1 and a dial manipulation portion 123 for allowing a user to control functions of the vehicle 1 may be installed at the gearbox 120.

The vehicle 1 may be configured for expanding a volume of the gearshift command input portion 200 to provide a changed gearshift range will hereinafter be described with reference to the attached drawings.

Figure 3:
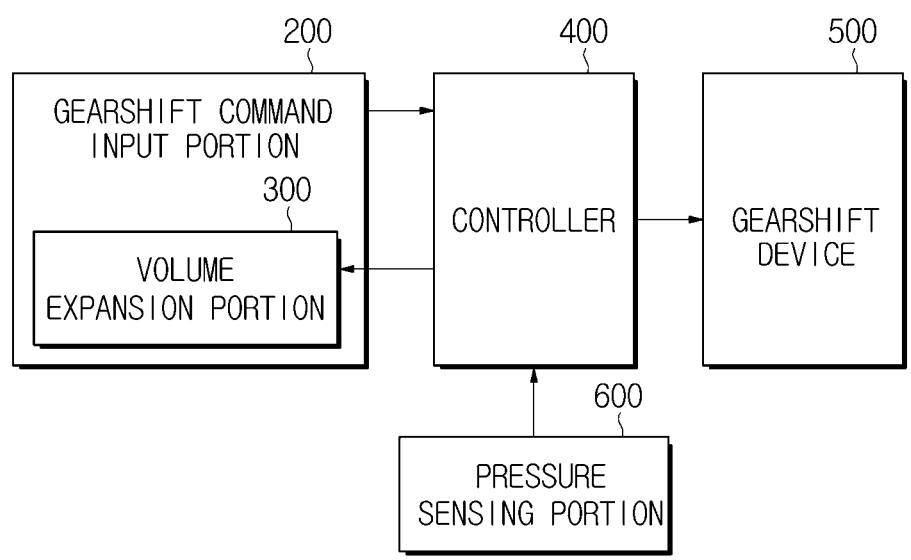
FIG. 3 is a block diagram illustrating the vehicle according to an embodiment of the present disclosure.

FIG. 3 is a block diagram illustrating the vehicle according to an embodiment of the present disclosure.

Referring to FIG. 3, the vehicle 1 may include the gearshift command input portion 200 configured to receive a gearshift command for changing a gearshift range. The vehicle 1 may include a gearshift device (also called a transmission) 500 to change a gearshift range in response to a gearshift command. The vehicle 1 may include a pressure sensing portion 600 to detect pressure of an inner space 213 of a gearshift lever (hereinafter referred to as a shift lever). The vehicle 1 may include a controller 400 to expand the gearshift command input portion 200 to have a volume corresponding to the changed gearshift range.

The gearshift command input portion 200 may receive a gearshift command configured to select any one of a plurality of gearshift ranges. For example, the gearshift ranges may include a P-range, an R-range, an N-range, a D-range, and the like. The gearshift ranges may include only some of the above ranges, or may further include other gearshift ranges as necessary.

The gearshift command input portion 200 may be formed in various shapes to receive a gearshift command. For example, the gearshift command input portion 200 may be implemented as a lever that is capable of being shifted to gears corresponding to the respective gearshift ranges. The gearshift command input portion 200 may also be implemented as a dial that includes a fixed top surface and a side surface surrounding the rim of the fixed top surface. The gearshift command input portion 200 receives a gearshift command through rotation of the side surface.

For convenience of description and a better understanding of the present disclosure, it is assumed that the gearshift command input portion 200 is implemented as a lever.

Figure 4A:
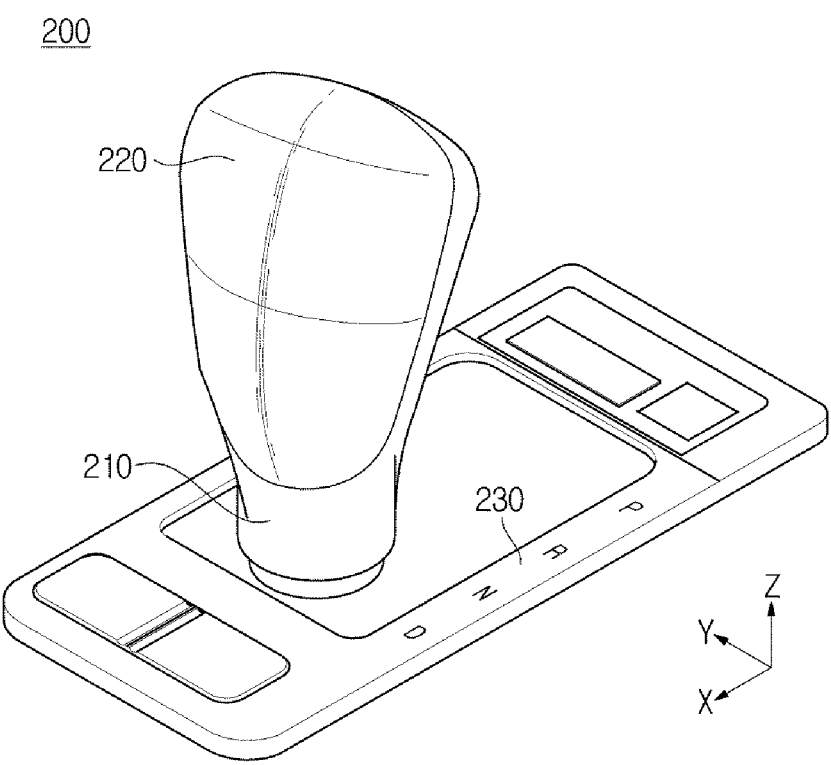
FIG. 4A is a perspective view illustrating a gearshift command input portion according to an embodiment of the present disclosure.
Figure 4B:
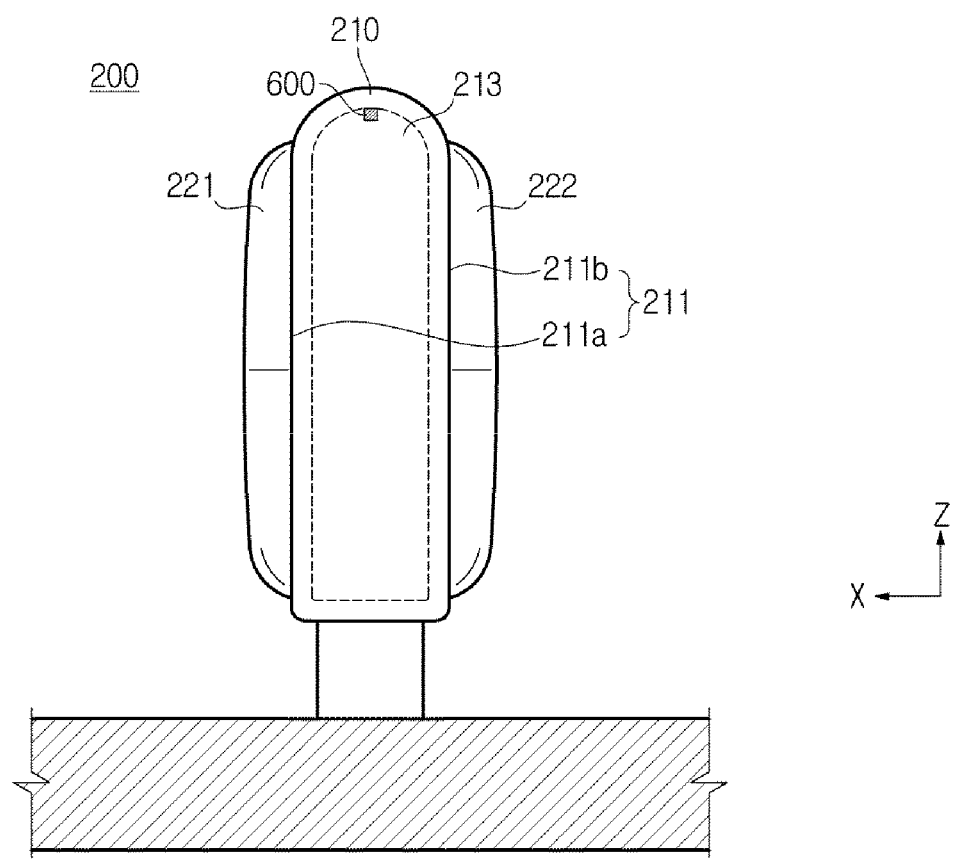
FIG. 4B is a side view illustrating a gearshift command input portion according to an embodiment of the present disclosure.

FIG. 4A is a perspective view illustrating a gearshift command input portion 200 according to an embodiment of the present disclosure. FIG. 4B is a side view illustrating a gearshift command input portion 200 according to an embodiment of the present disclosure.

The gearshift command input portion 200 may include a shift lever 210, an elastic cover 220, a gearshift index 230, and the like. The shift lever 210 may include at least one opening, and may be movable among a plurality of gear positions. The elastic cover 220 may be provided in at least one opening. The gearshift index 230 may inform a driver or user of the changed gear position.

Referring to FIG. 4A, the shift lever 210 may be provided to linearly reciprocate in an X-axis direction. Gear positions corresponding to a plurality of gearshift ranges may be provided on a gearshift route along which the shift lever 210 moves. As can be seen from FIG. 4A, an R-gear position corresponding to the reverse or R-range, an N-gear position corresponding to the neutral or N-range, and a D-gear position corresponding to the drive or D-range may be sequentially arranged on the gearshift route.

If the driver or user inputs a gearshift command by changing a gear position of the shift lever 210 to another gear position, the transmission 500 may perform gearshifting to change a gearshift range according to the received gearshift command. If the driver moves the shift lever 210 from the N-gear position to the D-gear position, the transmission 500 may change the gearshift range from the N-range to the D-range.

In the meantime, the gearshift index 230 may be located adjacent to the gear position. The gearshift index 230 may display the gearshift range related to the adjacent gear position. The driver may visually recognize the displayed gearshift range, and may move the shift lever 210 to a desired gearshift range.

In addition, the gearshift index 230 may inform the driver of a current gear position of the shift lever 210. For example, if the shift lever 210 is located at the N-gear position, a light located in the N-gear index 230 is turned on. The driver may recognize a current gearshift range indicating the N-range by visually confirming the light of the N-gear index 230.

In this case, the driver must visually confirm the gearshift index 230 embedded in the gearbox, resulting in reduction in the driver's concentration on driving. Therefore, the vehicle 1 according to the embodiment may inform the driver of a traveling range using other methods instead of the above visual confirmation method.

Referring to FIG. 4B, the shift lever 210 of the gearshift command input portion 200 according to the embodiment may include at least one opening 211, and the at least one opening 211 may include the elastic cover 220. The shift lever 210 may include the inner space 213 therein, and the inner space 213 may be connected to the outside through the at least one opening 211. The elastic cover 220 may be configured to close the opening 211, such that the inner space 213 of the shift lever 210 may be shielded from the outside of the shift lever 210.

FIGS. 4A and 4B, by example illustrate a front opening 211a located adjacent to the windshield 17 in the X-axis direction, and a rear opening 211b placed in the gearshift command input portion 200. For convenience of description and a better understanding of the present disclosure, it is assumed that a front elastic cover 221 for closing the front opening 211a and a rear elastic cover 222 for closing the rear opening 211b are used, as illustrated in FIGS. 4A and 4B.

In this case, the elastic cover 220 may be formed of a material capable of being expanded by external force. In other words, the elastic cover 220 is expanded to the outside of the shift lever 210 by pressure generated from the inner space 213 of the shift lever 210 to the elastic cover 220. Such expansion results in increased volume of the gearshift command input portion 200.

Referring back to FIG. 3, the gearshift command input portion 220 may further include a volume expansion portion 300 formed in the inner space 213 to expand the elastic cover 220. The volume expansion portion 300 may be controlled by a control signal received from a controller 400 to be described later.

The volume expansion portion 300 may include a fluid supply portion 310 configured to expand the elastic cover 220 by supplying fluid into the inner space 213 of the shift lever 210.

The fluid supply portion 310 may pressurize the elastic cover by supplying liquid and/or gas into the inner space 213 of the shift lever 210. For this purpose, the fluid supply portion 310 may include a fluid pipe, a fluid pump, and a fluid supply valve. The fluid pipe may deliver fluid from an external supply source. The fluid pump may provide pressure such that fluid may flow in the fluid pipe. The fluid supply valve may decide to open or close the fluid pipe.

Referring back to FIG. 3, the controller 400 may transmit a control signal to the fluid supply portion 310 in a manner that a predetermined amount of fluid can be supplied into the inner space 213 of the shift lever 210, the amount corresponding to the gearshift range changed by the gearshift position of the shift lever 210. Various methods for expanding the gearshift command input portion 200 according to a control signal of the controller 400 according to various embodiments of the present disclosure will hereinafter be described with reference to FIGS. 5A and 5B.

Figure 5A:
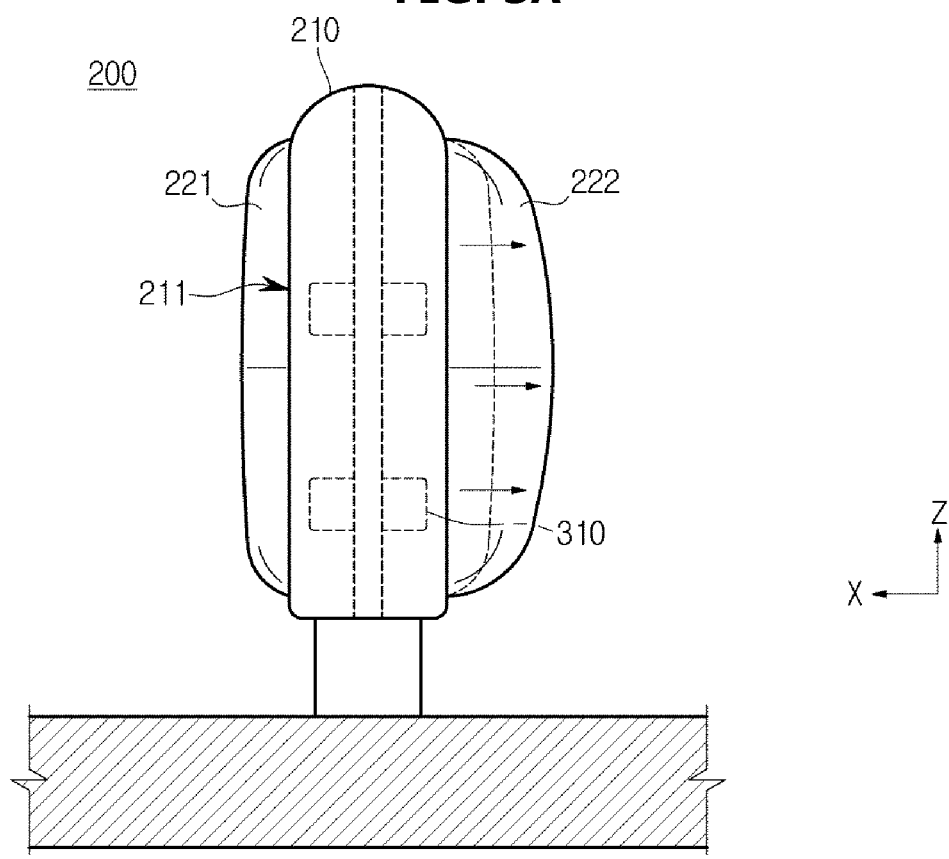
FIGS. 5A and 5B are views illustrating methods for expanding the gearshift command input portion according to various embodiments of the present disclosure.
Figure 5B:
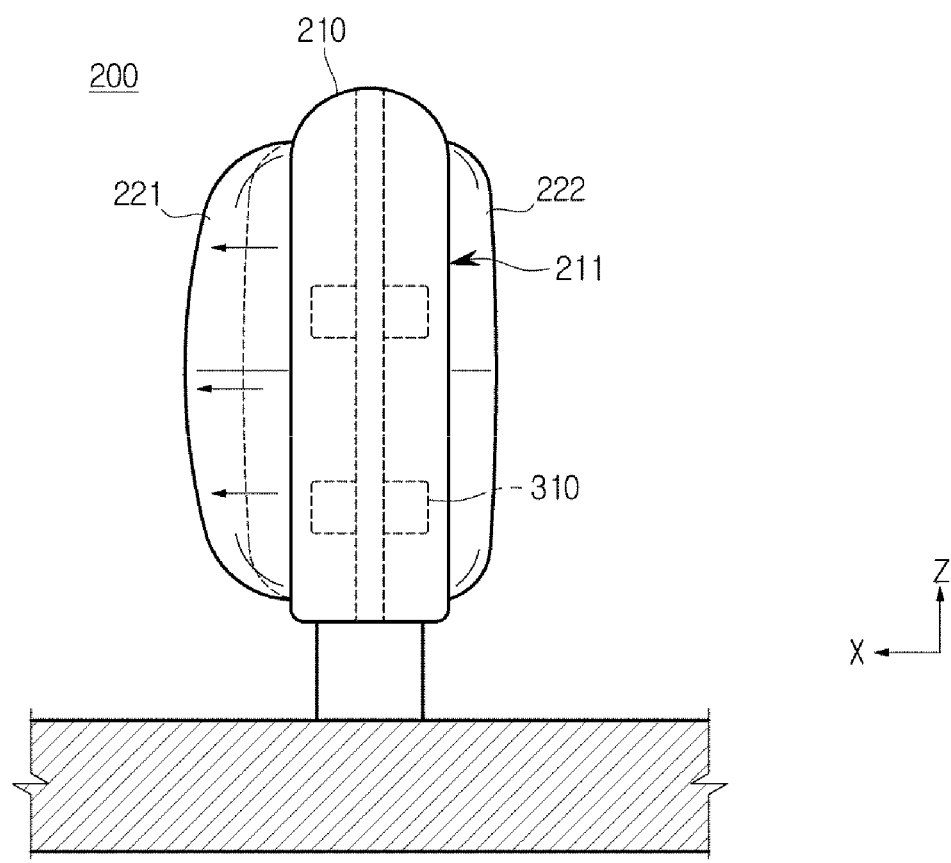
Figure 6A:
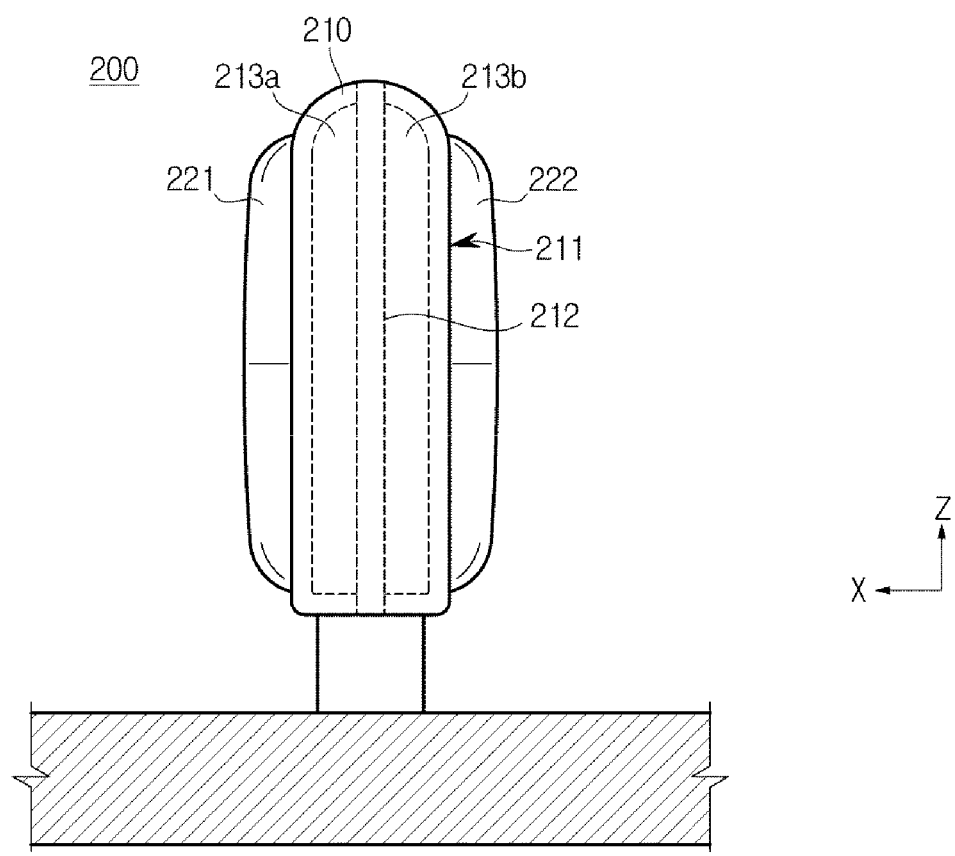
FIGS. 6A and 6B are views illustrating internal partitions according to various embodiments of the present disclosure.
Figure 6B:
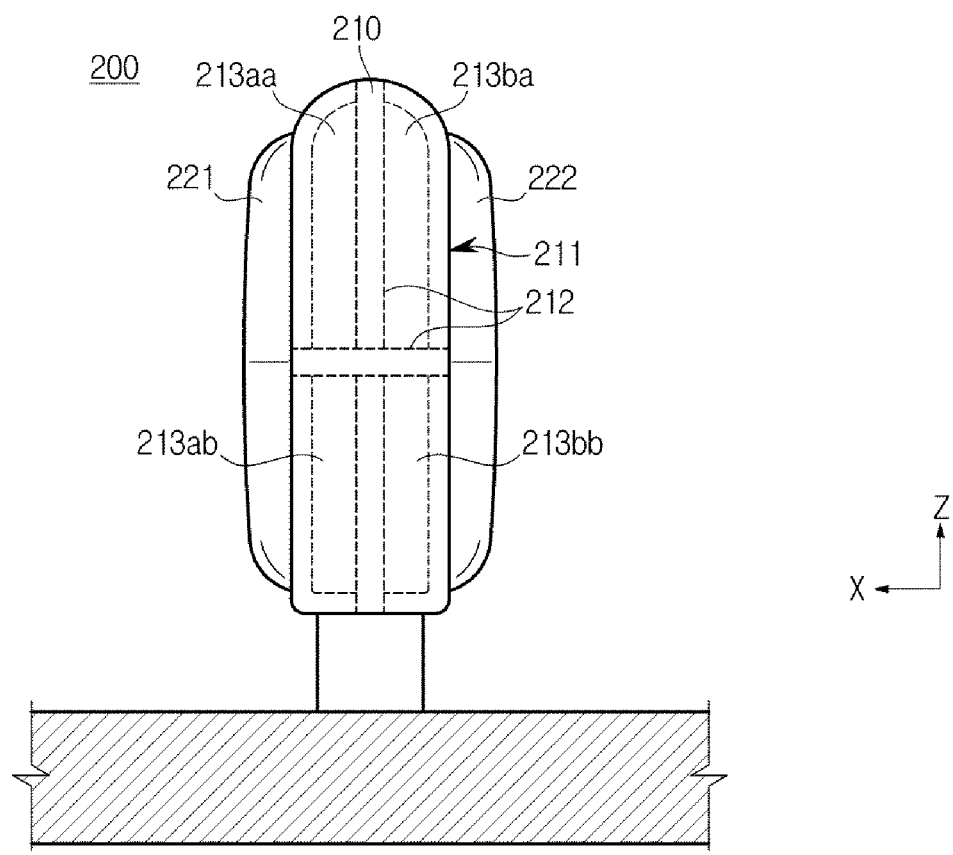

FIGS. 5A and 5B are views illustrating methods for expanding the gearshift command input portion 200 according to various embodiments of the present disclosure. FIGS. 6A and 6B are views illustrating internal partitions according to various embodiments of the present disclosure. FIGS. 7A-7D are views illustrating various methods for expanding the gearshift command input portion by the internal partition of FIG. 6B.

If the shift lever 210 is located at a first gearshift position and the gearshift range is changed to the first gearshift range, the controller 400 may control the fluid supply portion 310 in a manner that a first amount of fluid corresponding to the first gearshift range is supplied to the inner space 213 of the shift lever 210.

In contrast, if the shift lever 210 is located at a second gearshift position and the gearshift range is changed to a second gearshift range, the controller 400 may control the fluid supply portion 310 in a manner that a second amount of fluid corresponding to the second gearshift range is supplied to the inner space 213 of the shift lever 210.

As a result, the degree of expansion of the gearshift command input portion 200 may be changed according to the gearshift range. The driver may tactually recognize the degree of expansion of the gearshift command input portion 200, such that the driver may detect feedback to the gearshift command.

In addition, the controller 400 may control the fluid supply portion 310 in a manner that fluid is supplied to the position of the inner space 213 corresponding to the gearshift range. As a result, the expansion position of the gearshift command input portion 200 may be changed according to the gearshift range.

FIG. 5B, by example, illustrates expansion of the rear elastic cover 220 of the gearshift command input portion 200. FIG. 5B, by example, illustrates expansion of the front elastic cover 220. When the gearshift range is changed to a first gearshift range by the shift lever 210, the rear elastic cover 220 of the gearshift command input portion 200 is expanded as shown in FIG. 5A. When the gearshift range is changed to a second gearshift range by the shift lever 210, the front elastic cover 220 of the gearshift command input portion 200 is expanded as shown in FIG. 5B. As a result, the driver may tactually recognize the volume expansion position of the gearshift command input portion 200.

In order to change the expansion position, the shift lever 210 may include an inner partition 212 configured to divide the inner space 213 into a plurality of inner sub-spaces 213.

FIG. 6A, by example, illustrates one inner partition 212 configured to divide the inner space 213 into a front inner sub-spaces 213a and a rear inner sub-spaces 213b. In this case, the inner partition 212 may be located in a YZ plane.

If the fluid supply portion 310 provides fluid to the rear inner sub-space 213b according to a control signal of the controller 400, only the rear elastic cover 220 may be expanded as shown in FIG. 5A. In contrast, if the fluid supply portion 310 provides the front inner sub-space 213a according to a control signal of the controller 400, only the front elastic cover 220 may be expanded as shown in FIG. 5B.

In a different way from FIG. 6A, a plurality of inner partitions 212 may be provided in the inner space 213 of the shift lever 210. FIG. 6B illustrates an example in which the inner partition 212 in the YZ-plane and the inner partition 212 in the XY-plane are simultaneously used. As a result, the inner space 213 of the shift lever 210 may be divided into a front-upper inner sub-space 213aa, a front-lower inner sub-space 213ab, a rear-upper inner sub-space 213ba, and a rear-lower inner sub-space 213bb.

Figure 7A:
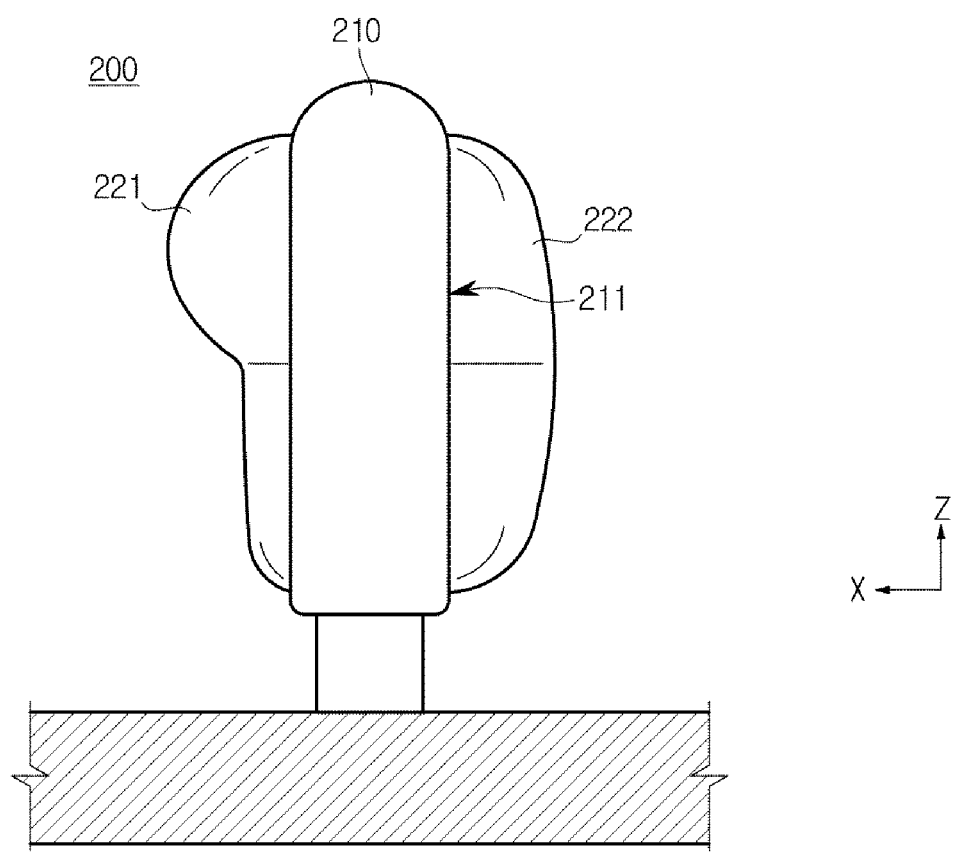
FIGS. 7A-7D are views illustrating various methods for expanding the gearshift command input portion by the internal partition of FIG. 6B.
Figure 7B:
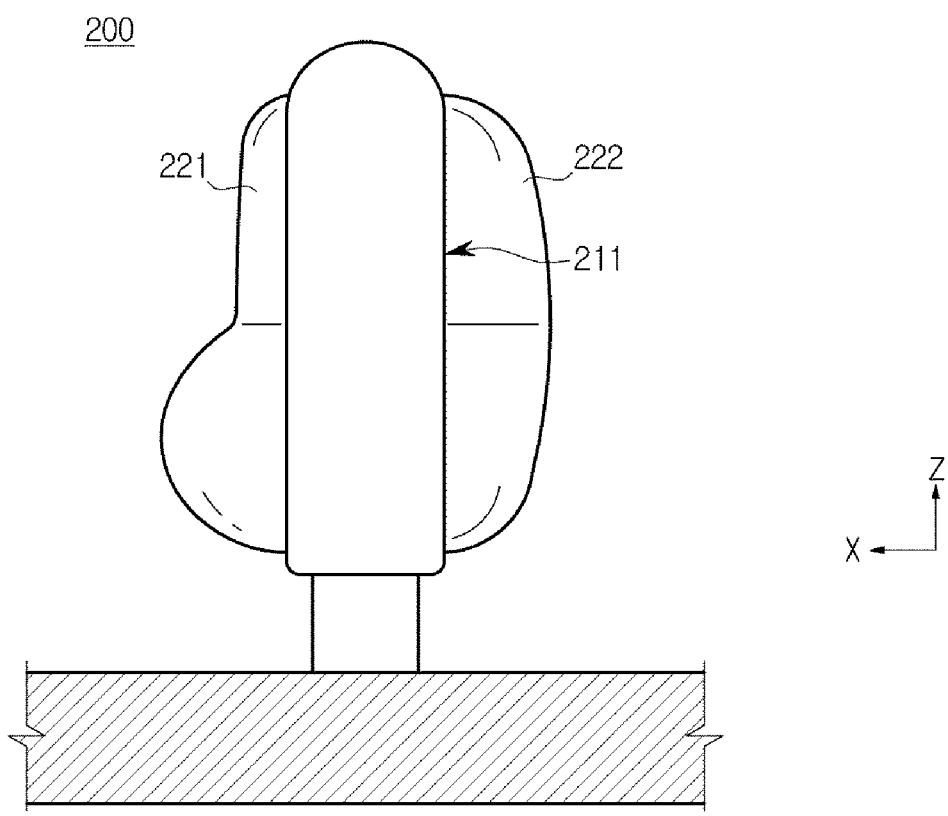
Figure 7C:
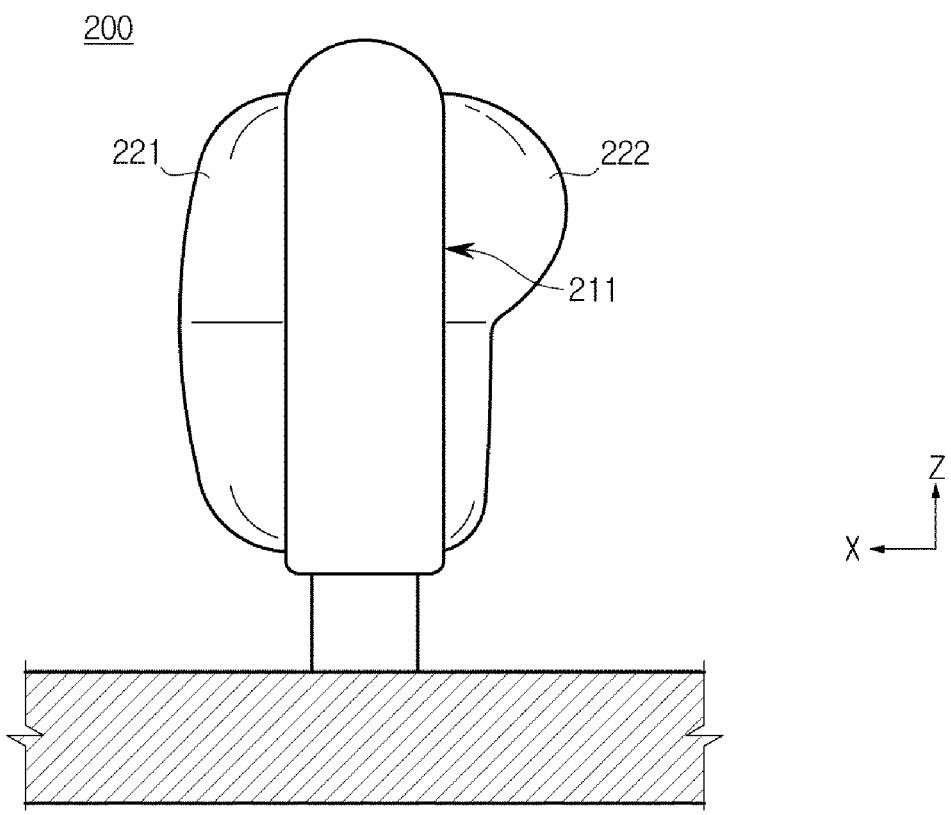
Figure 7D:
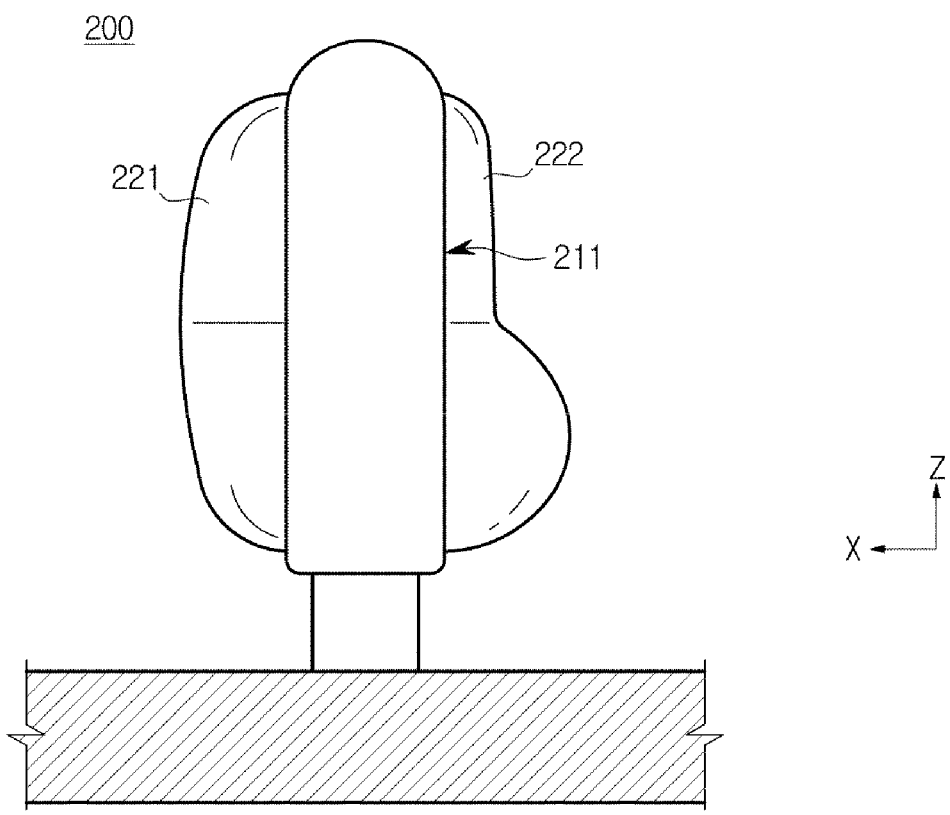

As a result, the volume of the gearshift command input portion 200 may be expanded at different positions. For example, if the fluid supply portion 310 provides fluid to the front-upper inner sub-space 213aa according to a control signal of the controller 400, only the front-upper elastic cover 220 may be expanded as shown in FIG. 7A. If the fluid supply portion 310 provides fluid to the front-lower inner sub-space 213ab according to a control signal of the controller 400, only the front-lower elastic cover 220 may be expanded as shown in FIG. 7B. If the fluid supply portion 310 provides fluid to the rear-upper inner sub-space 213ba according to a control signal of the controller 400, only the rear-upper elastic cover 220 may be expanded as shown in FIG. 7C. If the fluid supply portion 310 provides fluid to the rear-lower inner sub-space 213bb according to a control signal of the controller 400, only the rear-lower elastic cover 220 may be expanded as shown in FIG. 7D.

Accordingly, in response to various gearshift ranges, volume expansion may be achieved at various positions of the gearshift command input portion 220. As a result, the driver may tactually recognize the degree of expansion of the gearshift command input portion 200, thereby detecting feedback to the gearshift command.

In addition, a plurality of protrusions 223 may be formed at the outer surface of the elastic cover 220.

Figure 8A:
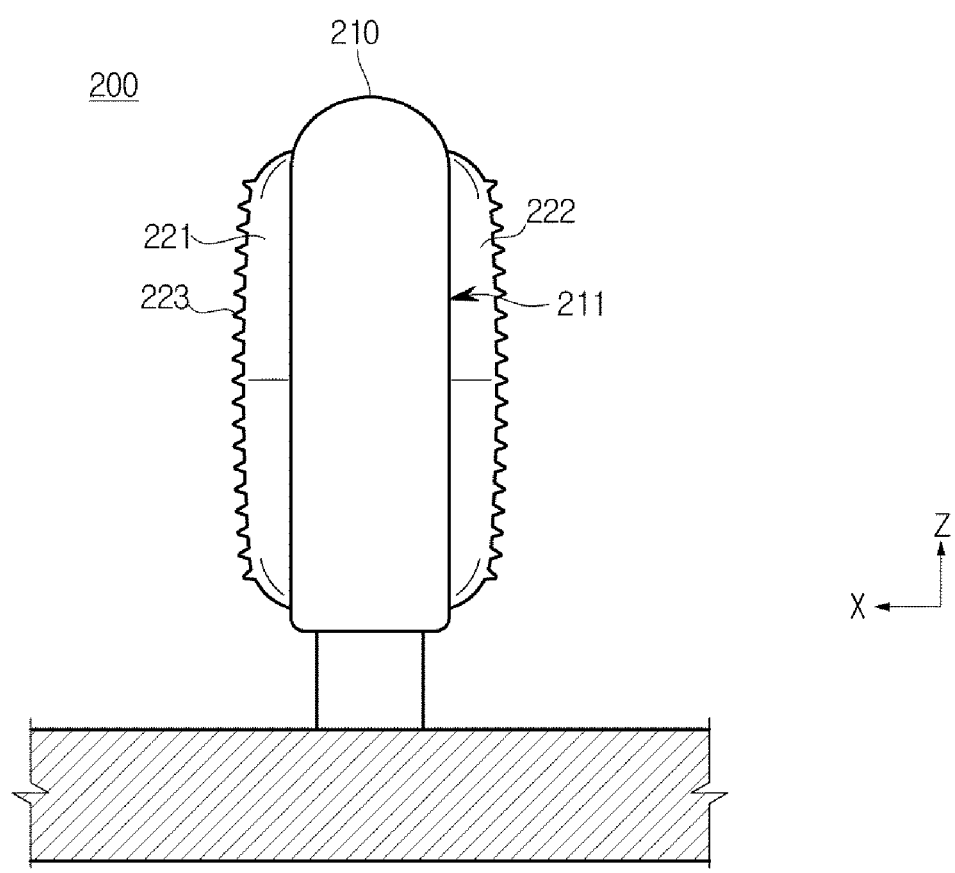
FIGS. 8A and 8B are views illustrating elastic covers for a gearshift command input portion, each cover having a plurality of protrusions according to an embodiment of the present disclosure.
Figure 8B:
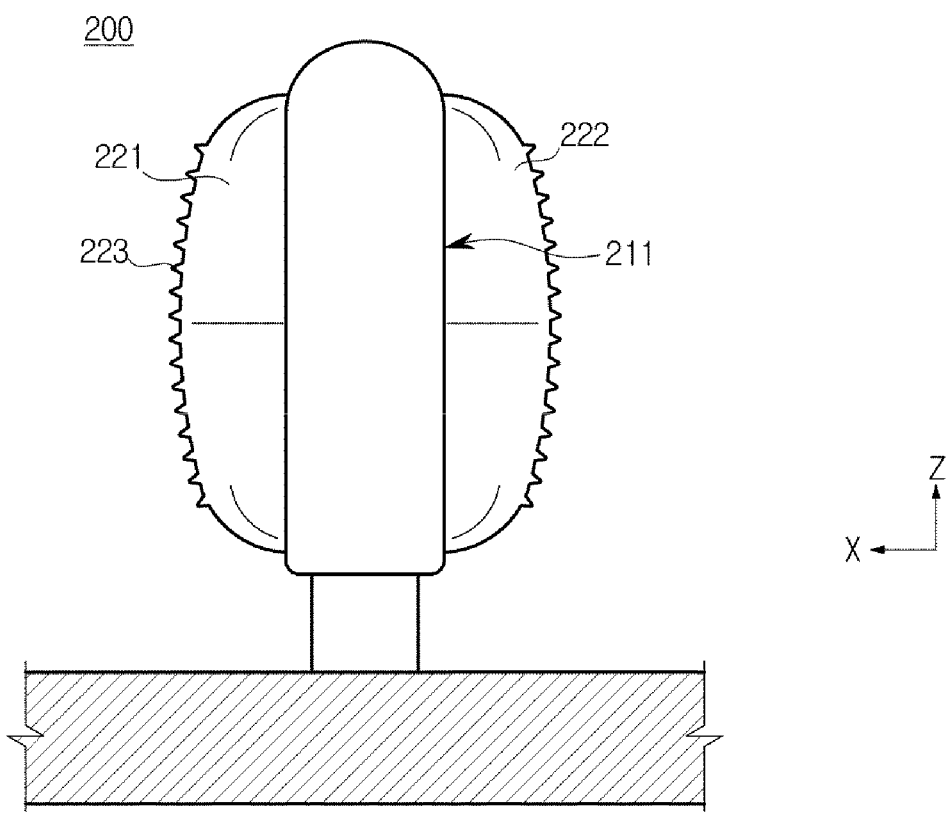

FIGS. 8A and 8B are views illustrating elastic covers each having a plurality of protrusions according to an embodiment of the present disclosure.

Referring to FIG. 8A, a plurality of protrusions 223 may be formed at the outer surface of the elastic cover 220 at intervals of a predetermined distance. When the driver grasps the gearshift command input portion 200, the driver may tactually recognize not only the presence of the plurality of protrusions 223 but also the spacing between the plurality of protrusions 223.

In this case, if fluid is supplied into the inner space 213 of the shift lever 210 according to a control signal of the controller 400, the elastic cover 220 may be expanded. If the elastic cover 220 is expanded, the regions disposed among the plurality of protrusions 223 are also be increased in size, such that the spacing between the plurality of protrusions 223 may be increased in size. It is recognized that the spacing between the plurality of protrusions 223 of FIG. 8B is larger in size than the spacing between the plurality of protrusions 223 of FIG. 8A.

The driver may tactually recognize not only expansion of the gearshift command input portion 200 but also the increased spacing between the plurality of protrusions 223, thereby detecting feedback to the gearshift command.

In addition, various parts capable of tactually stimulating the outer surface of the elastic cover 220 may also be provided. For example, a plurality of thorns may be densely formed at the surface of the elastic cover 220. One end of each thorn is fixed to the elastic cover 220, and the thorns are tightly joined to the elastic cover 220 before the vehicle is powered on. Thereafter, if the vehicle is powered on, the remaining thorn parts other than the one end fixed to the elastic cover 220 from among the plurality of thorns may be spaced apart from the elastic cover 220. The controller 400 may transmit an electric signal to the plurality of thorns formed at the surface of the elastic cover 220 according to change of the gearshift range, such that the driver may feel tactual variation.

Referring back to FIG. 3, the pressure sensing portion 600 may detect pressure generated from the shift-lever inner space 213, and may transmit the detection result to the controller. For this purpose, the pressure sensing portion 600 may be implemented as a pressure sensor and may be provided on the shift-lever inner space 213.

Upon receiving the detection result from the pressure sensing portion 600, the controller 400 may control the amount of supplied fluid on the basis of the detected pressure of the shift-lever inner space 213. In more detail, the controller 400 may determine whether a predetermined amount of fluid corresponding to the changed gearshift range is supplied to the inner space 213 of the shift lever on the basis of the detection result obtained from the pressure sensing portion 600. The controller 400 may then determine whether additional fluid will be supplied to the inner space 213 according to the result of determination.

The above-mentioned embodiment has disclosed that the volume expansion portion 300 is implemented as the fluid supply portion 310. In addition, the volume expansion portion 300 may include an actuator 700 configured to directly pressurize the elastic cover 220 within the inner space 213 of the shift lever 210.

Figure 9A:
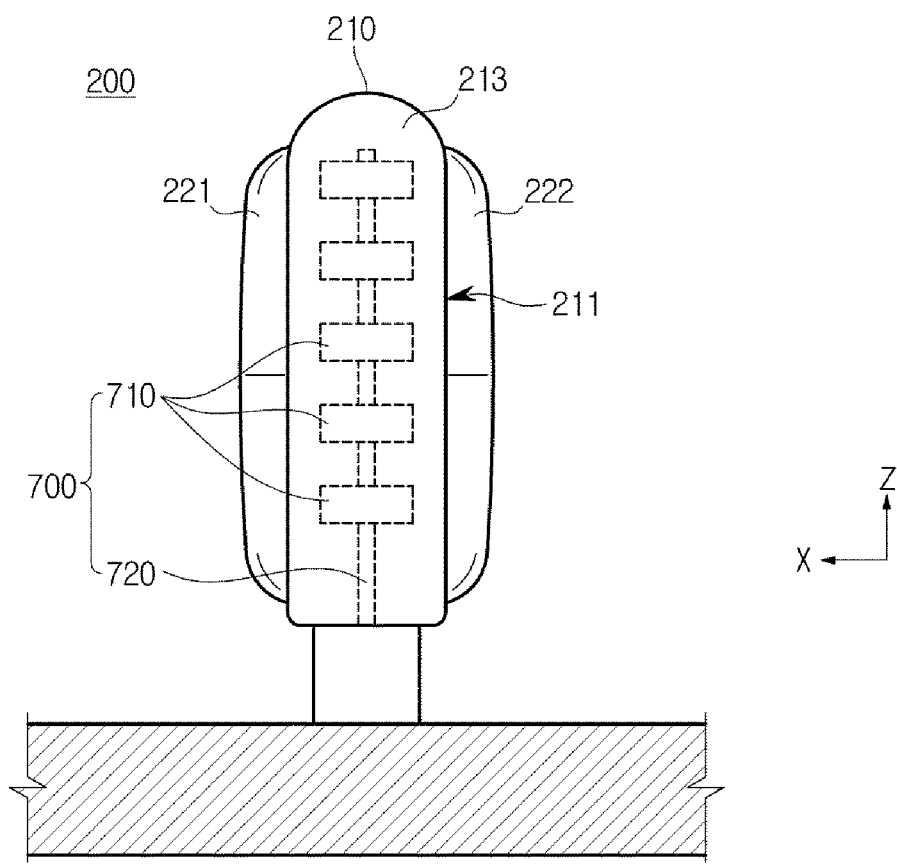
FIGS. 9A and 9B are views illustrating operations of an actuator for a gearshift command input portion according to an embodiment of the present disclosure.
Figure 9B:
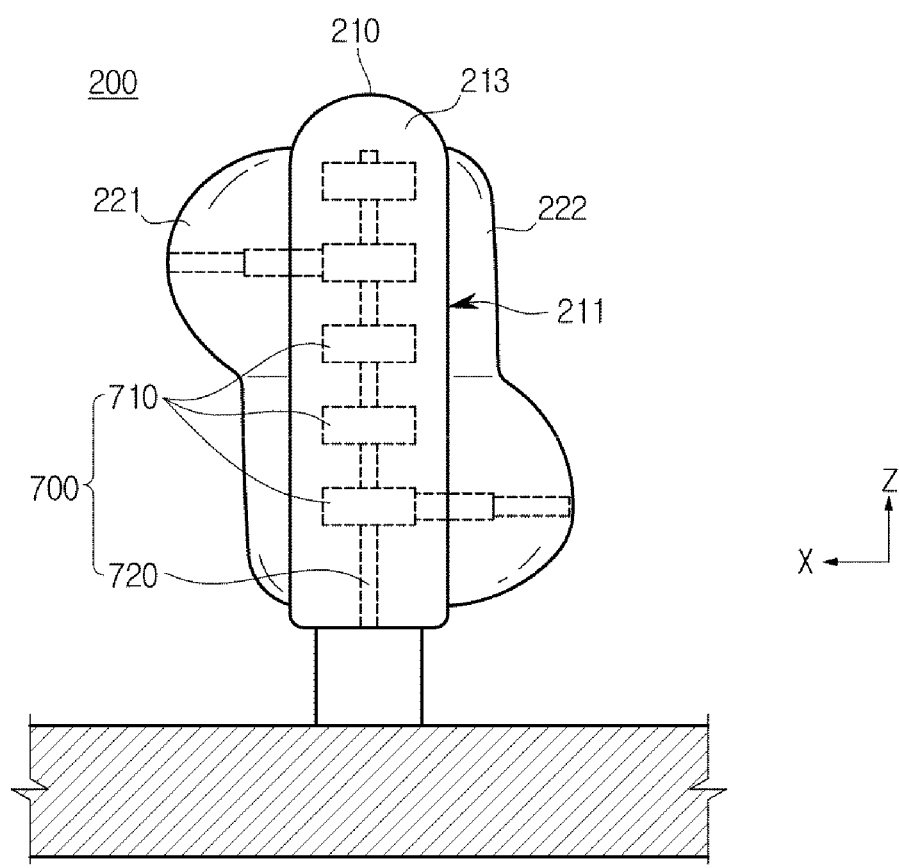

FIGS. 9A and 9B are views illustrating operations of an actuator 700 according to an embodiment of the present disclosure.

Referring to FIG. 9A, the actuator 700 may include a fixing portion 720 fixed to the shift lever inner space 213. The actuator 700 may include an extension portion 710, one end or both ends of which can be extended. Although FIG. 9A, by example, illustrates two extension portions 710 for convenience of description, the number of extension portions 710 fixed to the fixing portion 720 is not limited thereto.

The extension portion 710 of the actuator 700 may be changed in length. The extension portion 710 having the shortest length may not be in contact with the elastic cover 220 within the inner space 213 of the shift lever 210.

FIG. 9A, by example, shows that both ends of the extension portion 710 are not extended.

In contrast, the extension portion 710 of the actuator 700 may be extended in length according to a control signal of the controller 400, such that the extension portion 710 may be in contact with the elastic cover 220. If the extension portion 720 is extended in length after contacting the elastic cover 220 as shown in FIG. 9B, the pressing strength generated when the extension portion 710 pressurizes the elastic cover 220 may be increased. As a result, the expansion degree and the expansion position of the gearshift command input portion 200 may be changed.

Figure 10:
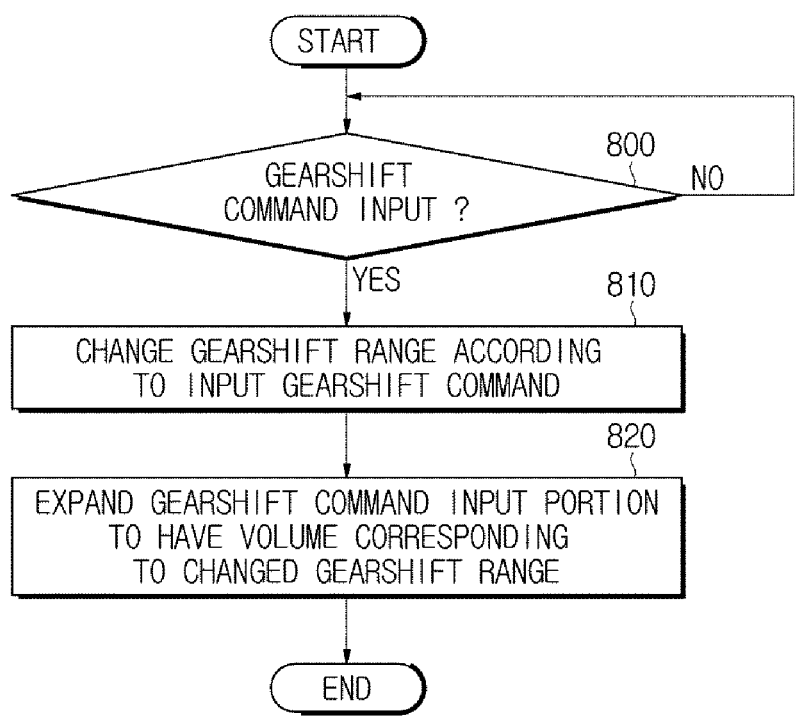
FIG. 10 is a flowchart illustrating a method for controlling the vehicle according to an embodiment of the present disclosure.

FIG. 10 is a flowchart illustrating a method for controlling the vehicle 1 according to an embodiment of the present disclosure.

Referring to FIG. 10, the vehicle 1 may confirm whether or not a gearshift command is input (Operation 800). In more detail, the gearshift command input portion 200 of the vehicle 1 may confirm whether the gearshift command for changing the gearshift range is input or not. If the gearshift command is not input, the vehicle 1 may repeatedly confirm whether or not the gearshift command is input.

In contrast, if the gearshift command is input, the vehicle 1 may change the gearshift range according to the input gearshift command (Operation 810). In more detail, the transmission 500 of the vehicle 1 may perform gear-shifting to the gearshift range corresponding to the gearshift command.

Finally, the vehicle 1 may expand the gearshift command input portion 200 to have a volume corresponding to the changed gearshift range (Operation 820). In more detail, the controller 400 of the vehicle 1 may provide fluid to the inner space 213 of the gearshift command input portion 200 such that the gearshift command input portion 200 may be expanded to have the volume corresponding to the gearshift range.

As a result, the driver may recognize a current gearshift range of the vehicle 1 using only tactile sensation.

As is apparent from the above description, the vehicle and the method for controlling the vehicle according to the embodiments of the present disclosure may allow a driver or user to tactually recognize feedback information regarding a gearshift command input. As a result, the driver may recognize a current gearshift range while looking forward during vehicle driving, resulting in an increase in the user's concentration on driving.

Although a few embodiments of the present disclosure have been shown and described, it should be appreciated by those having ordinary skill in the art that changes may be made in these embodiments without departing from the principles and spirit of the disclosure, the scope of which is defined in the claims and their equivalents.

What is claimed is:

1. A vehicle comprising:
a gearshift command input portion, a volume of which is controlled by a control signal, the gearshift command input portion configured to receive a gearshift command for changing a gearshift range;
an actuator comprising a plurality of extension portions included in the command input portion, each extension portion of the plurality of extension portions of the actuator being at a respective position within the gearshift command input portion and configured to extend in length, independently of whether other extension portions of the plurality of extension portions extend, to be in contact with an elastic cover of the gearshift command input portion, according to the control signal; and a controller configured to transmit the control signal to the gearshift command input portion to expand a part of the elastic cover of the gearshift command input portion corresponding to an extended length and respective position of a respective extension portion of the plurality of extension portions of the actuator, wherein the gearshift range includes at least one of parking, reverse, neutral, and drive.

2. The vehicle according to claim 1, wherein the gearshift command input portion includes:

a shift lever including at least one opening, the shift lever configured to receive the gearshift command in response to the changed gearshift position; and the elastic cover provided in the at least one opening.

3. The vehicle according to claim 2, wherein the gearshift command input portion further includes:

a fluid supply portion configured to provide fluid to an inner space of the shift lever so as to expand the elastic cover.

4. The vehicle according to claim 3, wherein the fluid supply portion provides a predetermined amount of the fluid to the inner space of the shift lever.

5. The vehicle according to claim 3, wherein the shift lever includes an inner partition for dividing the inner space into a plurality of inner sub-spaces.

6. The vehicle according to claim 5, wherein the fluid supply portion provides the fluid to at least one inner sub-space from among the plurality of inner sub-spaces.

7. The vehicle according to claim 3, further comprising:

a pressure sensing portion configured to detect pressure of the inner space of the shift lever.

8. The vehicle according to claim 7, wherein the controller controls an amount of the fluid supplied on the basis of the detected pressure of the inner space of the shift lever.

9. The vehicle according to claim 2, wherein the gearshift command input portion includes:

the actuator configured to apply pressure to the elastic cover by pressurizing an inner space of the shift lever.

10. The vehicle according to claim 2, wherein the elastic cover includes a plurality of protrusions formed at an outer surface thereof.

11. A method for controlling a vehicle having a gearshift command input portion that has a volume capable of being expanded and that receives a gearshift command for changing a gearshift range, the gearshift command input portion comprising an actuator, the actuator comprising a plurality of extension portions, each extension portion of the plurality of extension portions of the actuator being at a respective position within the gearshift command input portion, the method comprising:

receiving the gearshift command;

changing a length of a respective extension portion of the plurality of extension portions of the actuator, independently of whether other extension portions of the plurality of extension portions change in length, to be in contact with an elastic cover of the gearshift command input portion according to the received gearshift command; and expanding a part of the volume of the gearshift command input portion to have an expanded volume corresponding to the changed length and respective position of the respective extension portion of the plurality of extension portions of the actuator after contacting the elastic cover, wherein the gearshift range includes at least one of parking, reverse, neutral, and drive.

12. The method according to claim 11, wherein the gearshift command input portion includes:

a shift lever including at least one opening, the shift lever configured to receive the gearshift command in response to the changed gearshift position; and the elastic cover provided in the at least one opening.

13. The method according to claim 12, wherein the step of expanding the gearshift command input portion further includes:

providing fluid to the inner space of the shift lever so as to expand the elastic cover.

14. The method according to claim 13, wherein the step of providing the fluid to the inner space of the shift lever includes:

providing a predetermined amount of the fluid to the inner space of the shift lever, wherein the predetermined amount of the fluid corresponds to the changed gearshift range.

15. The method according to claim 13, wherein the shift lever includes an inner partition for dividing the inner space into a plurality of inner sub-spaces.

16. The method according to claim 15, wherein the step of providing the fluid to the inner space of the shift lever includes:

providing the fluid to at least one inner sub-space from among the plurality of inner sub-spaces, wherein the at least one inner space corresponds to the changed gearshift range.

17. The method according to claim 13, wherein the step of providing the fluid to the inner space of the shift lever includes:

detecting pressure of the inner space of the shift lever.

18. The method according to claim 17, wherein the step of providing the fluid to the inner space of the shift lever includes:

determining a cut-off time at which supply of the fluid is prevented on the basis of the detected pressure of the inner space of the shift lever.

19. The method according to claim 12, wherein the elastic cover includes a plurality of protrusions formed at an outer surface thereof.

* * * * *